United States Patent [19]

Stocker

[11] Patent Number: 4,852,425

[45] Date of Patent: Aug. 1, 1989

[54] VARIABLE LENGTH ROD ASSEMBLY HAVING LOCKING ADJUSTMENT MECHANISM

[75] Inventor: Raymond Stocker, West Bloomfield, Mich.

[73] Assignee: Ford Motor Company, Dearborn, Mich.

[21] Appl. No.: 138,478

[22] Filed: Dec. 28, 1987

[51] Int. Cl.⁴ .................... G05G 1/00; F16B 7/10
[52] U.S. Cl. ....................... 74/586; 403/105; 403/107; 74/503; 74/504
[58] Field of Search .................. 403/105, 107; 74/586, 74/501.5 R, 503, 504; 192/111 A

[56] References Cited

U.S. PATENT DOCUMENTS

| | | | |
|---|---|---|---|
| 2,395,332 | 2/1946 | Laymond | 74/586 X |
| 2,550,018 | 4/1951 | Morrison et al. | 403/107 X |
| 2,751,794 | 6/1956 | Sandberg et al. | 403/107 X |
| 2,805,584 | 9/1957 | Hinsey | 403/105 X |
| 3,078,738 | 2/1963 | Siegel | 74/586 |
| 3,132,532 | 5/1964 | Polanin | 74/586 |
| 3,496,800 | 2/1970 | Brezinski | 74/586 |
| 3,572,159 | 3/1971 | Tschanz . | |
| 3,587,341 | 6/1971 | Fiddler | 403/105 |
| 4,422,242 | 12/1983 | Stocker . | |
| 4,658,668 | 4/1987 | Stocker . | |
| 4,669,330 | 6/1987 | Stocker . | |
| 4,693,137 | 9/1987 | Deligny | 192/111 A |
| 4,762,017 | 8/1988 | Jaksic | 192/111 A |

FOREIGN PATENT DOCUMENTS 815436 10/1951 Fed. Rep. of Germany ...... 403/107
1359860 7/1974 United Kingdom ................ 403/107

OTHER PUBLICATIONS

1985 Car Shop Manual (Temp. Topaz, Escort/Lynx, EXP), pp. 17-25-18.

*Primary Examiner*—Vinh Luong
*Attorney, Agent, or Firm*—Frank G. McKenzie; Donald J. Harrington

[57] ABSTRACT

A rod connecting mechanical attachments whose positions in space and distances between each other are variable includes a rod carrying a grommet engageable by a pin located on one of the attachments and a pin formed on an adjustable member adapted to engage a grommet or other suitable mechanical attachment. The rod is connected to a housing by way of tangs located in rectangular slots, whereby the axial and angular position of the rod and housing are established. An adjuster is biased by a spring so that a tang formed on the adjuster contacts the end of a slotted hole formed in the housing. A lock has flexible legs extending downward into contact with stops and detents formed on the housing, and includes teeth formed on an inner bore adapted to engage teeth formed on the adjuster. Rotation of the lock causes the lock to engage the adjuster and to establish the axial position of the adjuster relative to the housing and lower attachment.

11 Claims, 2 Drawing Sheets

VARIABLE LENGTH ROD ASSEMBLY HAVING LOCKING ADJUSTMENT MECHANISM

BACKGROUND OF THE INVENTION

1. Field of the Invention

This invention relates to a control rod assembly that transmits motion from one connected device to another. More particularly, this invention pertains to such devices that include means for adjusting the length of the control rod.

2. Description of the Prior Art

Devices that transmit motion from one movable component to another, such as cable assemblies, generally provide an attachment on a conduit containing the cable for connecting the conduit to a support structure, and a cable extending from each end of the conduit. Whether the connecting devices are cable assemblies or rods capable of carrying loads in either direction, it is often necessary to adjust the effective length of the assembly that extends between the support structure and one end of the cable or between the ends of the rod assembly attached to the movable components, while the assembly is being installed.

Where a cable assembly is used for this purpose, the length of the cable that extends from the end of the conduit may be changed by altering the length of the path over which the conduit extends. Usually the paths are curves or bends whose lengths are reduced by increasing the length of the conduit that extends beyond the mounting points of the assembly. However, once the assembly is adjusted, it is usually difficult to release the locking member from engagement with ratchet teeth on a fitting that is secured to the conduit in order to reposition or readjust the assembly for repair and maintenance. U.S. Pat. Nos. 3,572,159; 4,669,330; 4,658,668 describe cable assemblies of this type. A frequent disadvantage that arises in cable assemblies is the difficulty required to vary the force used to set and maintain the length of the cable assemblies.

Where adjustable length rod assemblies are used to transmit motion between members connected to the rod assembly, the prior art has employed a threaded mechanical connection biased by the coiled spring and retained in position by a set screw driven against the rod assembly and held on a trunnion, whose position along the length of the rod is adjustable in accordance with the position where the set screw engages the rod. Where this technique is employed, high extraneous randomly directed loads caused by the process of wrench tightening the set screw are introduced to the rod assembly during the process of establishing its length. As a result, an assembly operator is required to carefully adjust and check the length of the rod assembly. U.S. Pat. No. 4,422,242 describes and illustrates a throttle valve linkage adjustment gauge wherein a rod assembly 10 is attached to the gauge by a pin and grommet connection. It is preferred that some other technique than the use of wrench tightening requiring high torque be used to establish the length of the rod.

SUMMARY OF THE INVENTION

The rod assembly according to this invention can be set precisely to its required length during the assembly process and maintained at that length throughout its service life manually without tools upon application of a low magnitude of torque applied to the rod assembly. Furthermore, a locking device fixes the length of the rod assembly with a locking action that is restricted to the least sensitive direction, i.e., radially and perpendicular to the adjustment direction. This device eliminates the need for an operator to adjust the rod length and later to check its length after assembly for accuracy. The locking mechanism of this invention is set and maintained in the correct position by an operator with a finger tightening mechanism.

In realizing these objectives, the rod assembly carries at one axial end a component, such as a grommet, adapted to receive a pin carried on one of the movable components connected by the rod assembly. At the opposite end of the assembly, a second mechanical connection is located, which may also be a pin-grommet attachment. A housing, located between the two mechanical attachments, receives a compression spring in a bore. An adjuster, which connects to the housing at a fixed angular position, is urged by the spring to an extreme axial position. The adjuster includes screw threads or teeth formed on a cylindrical shank. The screw threads extend approximately 90° about the axis of the shank and along a substantial portion of its length. A locking device is held in axial position at the top of the housing by engagement with a collar, which permits it to rotate about the axis of the housing. The locking member includes diametrically opposite legs which engage and contact various stop surfaces and detents formed on the outer surface of the housing.

The rod assembly is stored and shipped with the adjuster in an extended axial position, where the teeth of the locking component and those of the adjuster are unable to become engaged due to the effect of the compression spring that forces the adjuster teeth away from the locking teeth. On assembly, the grommet at the lower end of the rod assembly is fitted on a suitable pin member carried on one of the displaceable components connected by the rod assembly. The pin formed on the adjuster is inserted into a grommet carried on the other displaceable component. In the process of fitting the adjuster pin into the corresponding grommet, the adjuster is moved against the force of the spring within the housing to a position where the locking teeth can become engaged with the teeth of the adjuster and thereby establish the required length of the assembly. When the operator has determined the correct position of the rod assembly, the locking component is rotated by hand about the axis of the housing until one of the legs of the lock contacts a stop on the housing that limits further rotation. A detent adjacent the lock component leg impedes rotation of the lock from the locking position and the stop absolutely prevents such rotation. A second stop on the lock and an associated detent hold the lock in its correct shipping position, impede its inadvertent rotation in one direction and prevent its disconnection from the housing.

The rod assembly is preferably molded from low cost, plastic material, which is particularly suited to the formation of screw threads or teeth that remain engaged after being brought into mesh manually without high assembly torque.

BRIEF DESCRIPTION OF THE PREFERRED EMBODIMENT

Figures 1, 2:
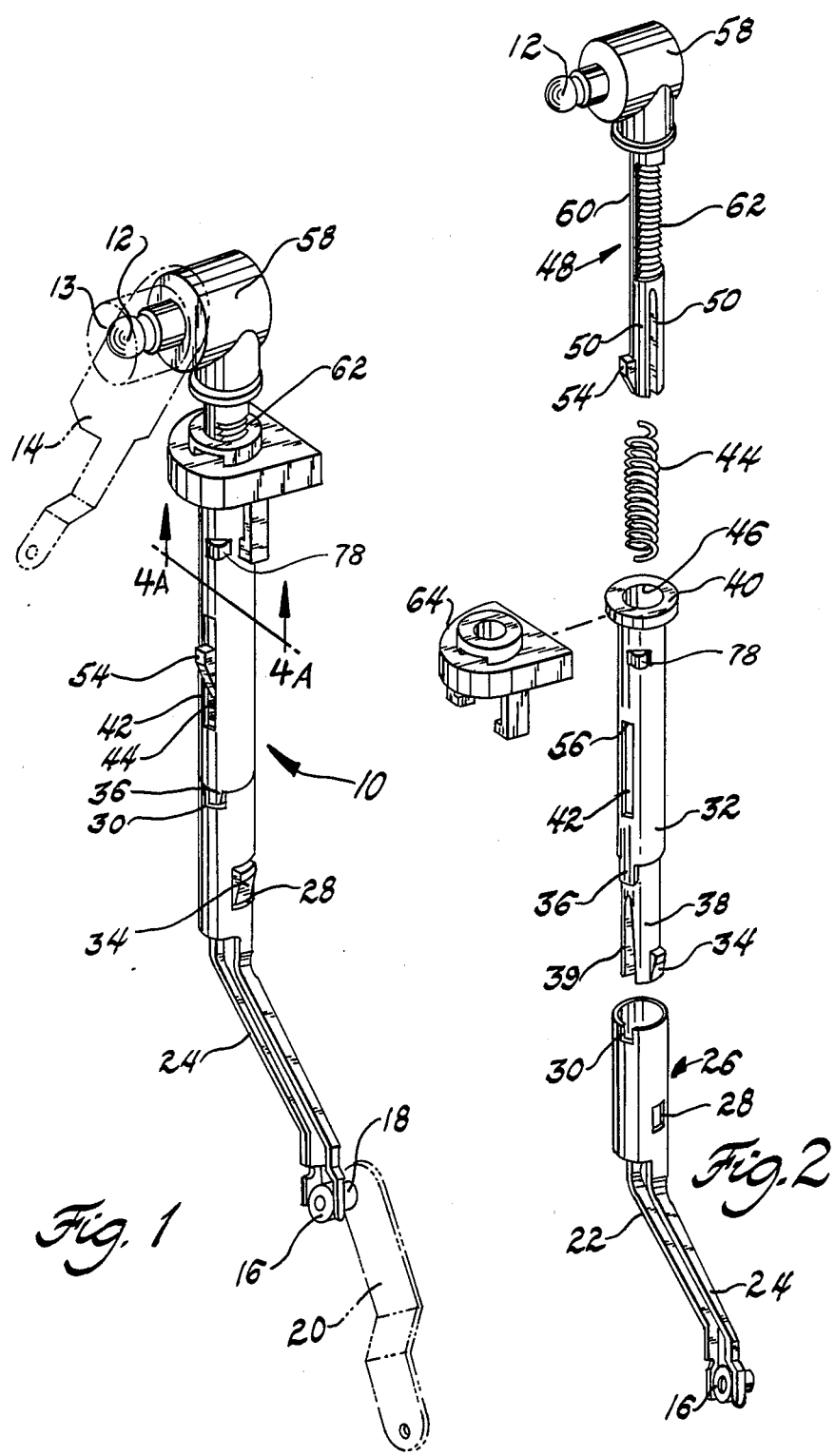
FIG. 1 is an isometric view of the variable length rod of this invention assembled and connected at each of its ends to pivoting components whose motions are coordinated by the rod assembly.
FIG. 2 is an isometric view of the rod assembly showing the components spaced from one another.

Referring first to FIG. 1, the rod assembly 10 has a pin 12 located at its upper end, adapted to seat within a grommet 13 carried on an engine throttle valve linkage, which pivots in accordance with the position of the engine throttle or accelerator pedal controlled by the vehicle operator. At the opposite end of the rod assembly, a grommet carried on the rod is adapted to be engaged by a pin 18 carried on a transmission throttle valve control lever 18, which pivots as the position of grommet 16 moves due to operator control over the accelerator pedal. In an assembly plant, the position of pin 18 and of grommet 13 varies due to manufacturing and assembly tolerances associated with locating the engine and transmission within the engine compartment of a motor vehicle. The rod assembly of this invention accommodates these tolerances and establishes the length of the rod assembly while the rod is being fitted in position and attached to pin 18 and grommet 13.

FIG. 2 shows the components that comprise the rod assembly. Grommet 16 is supported on a rod 22, which includes an arm 24 extending downward from a cylindrical sleeve 26 formed with a rectangular hole 28 through its thickness and a rectangular slot 30 at its upper, open end. Rod 22 can be formed integrally with the housing 32 or it can be connected mechanically to the housing 32 by fitting a tang 34, located at the lower end of the housing within hole 28, and locating a tab 36 within the rectangular slot 30 the means for connecting the housing and rod. The tank is carried at the lower end of a slotted leg 38, which, with another leg 39, can be fitted within the cylindrical sleeve 26. When tang 34 is moved downward within sleeve 26 and into alignment with hole 28, leg 38 springs radially outward permitting the engagement.

The housing 32 terminates at a collar 40 and has a rectangular hole 42 extending along a substantial portion of its length formed through its thickness. Below the collar, above hole 42 and located on the outer surface of the housing are multiple detents and stops, which are discussed below with reference to FIGS. 4A–4C.

A helical coiled spring 44 is fitted within the cylindrical hole 46, which extends along the housing, and seats on an annular ring formed on the inner surface of the rod.

An adjuster 48 has two legs 50, 52 extending downward from its lower end. On one of the legs 50, a second tang 54 is formed and sized to fit within hole 42 by deflecting legs 50, 52 radially inward, fitting them within the cylindrical bore 46, and forcing the adjuster downward against the force of spring 44 until tang 54 is brought into angular and axial alignment with hole 42 the alignment means for fixing the angular position. The spring biases the adjuster axially awaym from the rod and forces the upper end of tang 54 into contact with the upper end 56 of the slotted hole 42. This is the position of the rod assembly when it is being shipped, stored and before its assembly in the engine compartment. The adjuster includes a head 58 from which pin 12 extends radially outward. The shank 60 of the adjuster is substantially cylindrical and is formed with multiple teeth 62, first engageable means, that extend partially around the axis of the shank and along a substantial portion of its length.

Figure 3A:
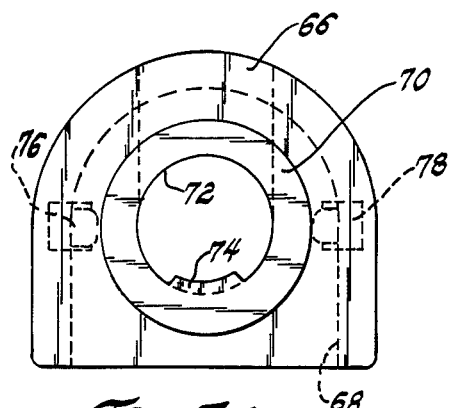
FIG. 3A is a top view of the lock component.
Figure 3B:
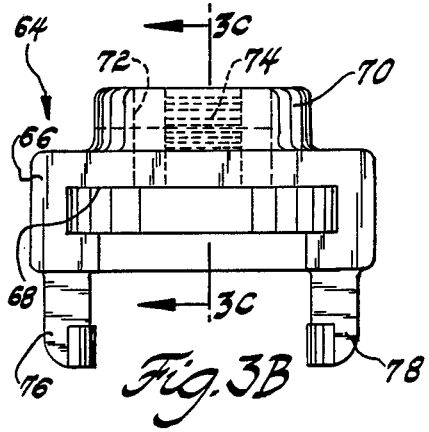
FIG. 3B is a side view of the lock.
Figure 3C:
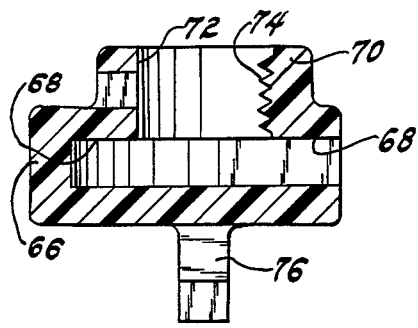
FIG. 3C is a cross section taken at plane 3C—3C of FIG. 3B.

Referring next to FIGS. 3A–3C, a lock 64 is located in a fixed position along the axis of housing 32, rotatably about the axis of the housing by engagement with collar 40. The lock includes a body portion 66 formed with a slot 68, which extends partially through the body and permits collar 40 to be inserted therein. A cylindrical collar 70 located above the body has a central bore 72, on which screw threads 74, the second engageable means, extend angularly approximately 90° about the axis of the collar and are sized to engage the teeth 62 on the adjuster. Two diametrically opposite legs 76, 78 extend downward from the body for engagement with the stops and detents located at the upper end of the housing. On assembly, slot 68 is aligned with collar 40 and the lock slides over the collar until legs 76, 78 are aligned with the axis of the housing and engage the stops and detents.

Figure 4A:
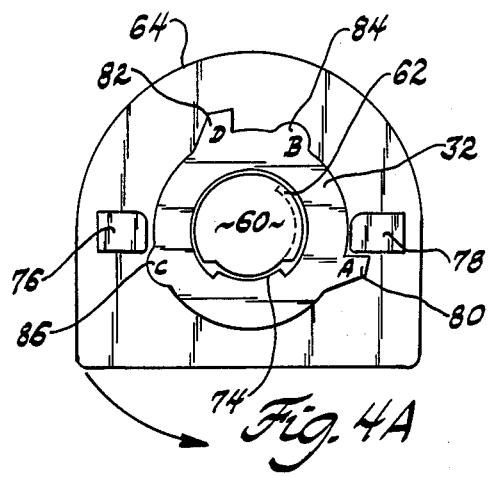
FIGS. 4A–4C show the changing positional relationship among the detents and stops, located on the outer surface of the housing, and the legs of the lock, during various stages of the adjustment and assembly process.
Figure 4B:
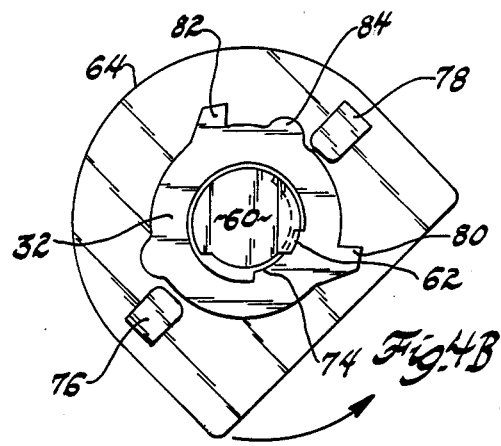
Figure 4C:
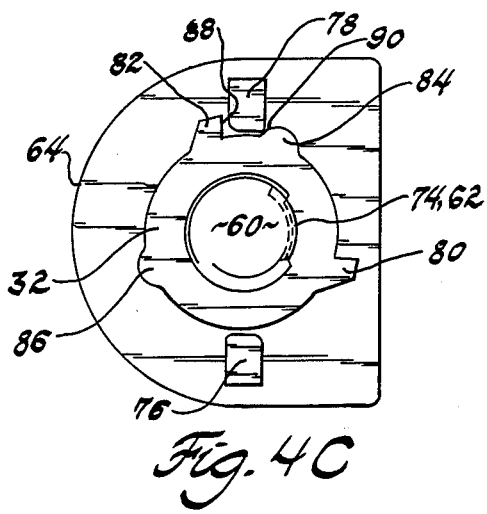

FIGS. 4A–4C show the lock at three angular positions during the process of engaging teeth 62 on the adjuster. FIG. 4A shows the adjuster teeth 62 and lock teeth 74 fully disengaged after lock 64 is moved into position over collar 40. There, the adjuster is biased by spring 44 upward and can be moved manually by the operator to any axial position within the constraint imposed by tang 54 abutting the axial extremities of hole 42. Molded integrally on the outer surface of the housing are formed a first stop 80, a second stop 82, a first detent 84, and a second detent 86. When teeth 62 and 74 are entirely disengaged, stop 80 contacts leg 78 and the length of the adjuster is set subject to the constraints of hole 42 and tang 54. Then, lock 64 is rotated counterclockwise, when viewed from below as shown in FIG. 4B, whereby leg 78 moves away from stop 80 and toward detent 84, and leg 76 passes over detent 86, thereby limiting the ability of the lock to reverse its rotation relative to the housing. Still further rotation of the lock causes teeth 62 and 74 to become fully engaged, forces leg 78 over detent 84, and locates the angular position of lock 64 between surface 88 on stop 82 and surface 90 on detent 84, due to their contact with adjacent surfaces of leg 78.

When the adjuster is fully extended within housing 32 so that tang 54 contacts the top edge of hole 42 and the spring biases the adjuster to that position the teeth 74 of the lock cannot engage teeth 62 of the adjuster. This feature prevents premature locking during shipment and handling of the assembly. Spring 44 forces the looseness in the system to be in one axial direction, thereby reducing the adjustment variance so that the center of the statistical sample means can be located over the desired setting of the adjuster within the housing. The irregular shape of lock 64 provides a ready, visual means for determining whether it has been rotated to the locked position.

Having described the preferred embodiment of my invention, what I claim and desire to secure by U.S. Letters Patent is:

1. A connecting device having an adjustable length, comprising:

an adjuster adapted to support a component of a first mechanical attachment thereon;

first engageable means extending along a portion of the length of the adjuster;

a housing adapted to support a component of a second mechanical attachment thereon;

alignment means for fixing the angular position of the housing relative to the adjuster and permitting the axial position of the housing to vary relative to the adjuster; and locking means having second engageable means for fixing the axial position of the adjuster relative to the housing by mutual engagement of the first and second engageable means.

2. The device of claim 1 further comprising means biasing the adjuster axially away from the housing and wherein the alignment means limits axial movement of the adjuster relative to the housing.

3. The device of claim 1 wherein the locking means is connectable to the housing at a fixed axial position and is supported rotatably on the housing.

4. The device of claim 1 further comprising means for releasably holding the locking means in a locked and an unlocked position relative to the adjuster.

5. The device of claim 4 wherein the locking means includes a first leg engageable with the holding means, and the holding means includes:

a first stop extending radially outward from the housing and contactable by the first leg while the first and second engageable means are disengaged;

a second stop extending radially outward from the housing; and a first detent located adjacent the second stop and angularly spaced therefrom to receive the first leg in the space therebetween while the first and second engageable means are engaged mutually.

6. The device of claim 5 wherein the locking means includes a second leg engageable with the holding means, and wherein the holding means furhter includes:

a second detent extending radially from the housing, located between the first and second stops and engageable with the second leg as the locking means rotates between positions where the first and second engageable means are engaged and disengaged.

7. The device of claim 3 wherein the locking means includes a first leg engageable with the holding means, and holding means further including a which includes:

a first stop extending radially outward from the housing and contactable by the first leg while the first and second engageable means are disengaged;

a second stop extending radially outward from the housing; and a first detent located adjacent the second stop and angularly spaced therefrom to receive the first leg in the space therebetween while the first and second engageable means are engaged mutually.

8. The device of claim 7 wherein the locking means includes a second leg engageable with the holding means, and wherein the holding means further includes:

a second detent extending radially from the housing, located between the first and second stops and engageable with the second leg as the locking means rotates between positions where the first and second engageable means are engaged and disengaged.

9. The device of claim 2 wherein the locking means includes a first leg engageable with the holding means, and holding means further including a which includes:

a first stop extending radially outward from the housing and contactable by the first leg while the first and second engageable means are disengaged;

a second stop extending radially outward from the housing; and a first detent located adjacent the second stop and angularly spaced therefrom to receive the first leg in the space therebetween while the first and second engageable means are engaged mutually.

10. The device of claim 9 wherein the locking means includes a second leg engageable with the holding means, and wherein the holding means further includes:

a second detent extending radially from the housing, located between the first and second stops and engageable with the second leg as the locking means rotates between positions where the first and second engageable means are engaged and disengaged.

11. A device having an adjustable length, extending between and connecting two mechanical attachments separated by an undefined or variable distance, comprising:

a rod having a component of a first mechanical attachment supported thereon;

an adjuster having a component of a second mechanical attachment supported thereon, and engageable means extending along the length of the adjuster;

a housing located between the rod and the adjuster, having means for fixing the angular position of the housing relative to the adjuster and permitting a variable axial position of the housing relative to the adjuster;

means for connecting at a fixed angular and axial position the housing and the rod;

means biasing the adjuster axially away from the housing; and locking means connected to the housing at a fixed axial position and supported rotatably on the housing for connecting the adjuster and the housing by engagement with the engageable means of the adjuster.

* * * * *